US012690514B2

(12) United States Patent
Decker et al.

(10) Patent No.: US 12,690,514 B2
(45) Date of Patent: Jul. 28, 2026

(54) AUTOMATIC FEED SYSTEM FOR A TRIMMER

(71) Applicant: FireFly Automatix, Inc., Salt Lake City, UT (US)

(72) Inventors: William M. Decker, Salt Lake City, UT (US); Eric E. Aston, Farmington, UT (US); Mark C. LeBlanc, Salt Lake City, UT (US); Daniel A. Aposhian, West Valley City, UT (US); Steven R. Aposhian, Farmington, UT (US)

(73) Assignee: FireFly Automatix, Inc., Salt Lake City, UT (US)

( * ) Notice: Subject to any disclaimer, the term of this patent is extended or adjusted under 35 U.S.C. 154(b) by 736 days.

(21) Appl. No.: 18/064,154

(22) Filed: Dec. 9, 2022

(65) Prior Publication Data

US 2024/0188486 A1      Jun. 13, 2024

(51) Int. Cl.
| | |
|---|---|
| *A01D 34/416* | (2006.01) |
| *B65H 61/00* | (2006.01) |
| *A01D 34/835* | (2006.01) |
| *A01D 101/00* | (2006.01) |

(52) U.S. Cl.
CPC ......... *A01D 34/4162* (2013.01); *B65H 61/00* (2013.01); *A01D 34/835* (2013.01); *A01D 2101/00* (2013.01); *B65H 2405/572* (2013.01);

*B65H 2405/575* (2013.01); *B65H 2405/584* (2013.01); *B65H 2553/00* (2013.01); *B65H 2701/354* (2013.01)

(58) Field of Classification Search
CPC .............. A01D 34/4162; A01D 34/835; A01D 2101/00; B65H 61/00; B65H 2405/572; B65H 2405/575; B65H 2405/584; B65H 2553/00; B65H 2701/354
See application file for complete search history.

(56) References Cited

U.S. PATENT DOCUMENTS

| | | | |
|---|---|---|---|
| 2019/0269070 A1* | 9/2019 | Zha | A01D 34/4161 |
| 2023/0011491 A1* | 1/2023 | Levin | A01D 34/4163 |

FOREIGN PATENT DOCUMENTS

WO      WO-2012067521 A1 *   5/2012   ............... B66D 1/52

* cited by examiner

*Primary Examiner* — Liang Dong
(74) *Attorney, Agent, or Firm* — Kirton McConkie; Brian Tucker

(57) ABSTRACT

An automatic feed system for a trimmer is provided. Such trimmers include a line that can be spun at high speeds to cut vegetation along roadsides or other areas. The automatic feed system is configured to dynamically detect the current length of the line and automatically feed the line to maintain a maximum or desired length for cutting. This length may typically correspond with the radius of a trimmer deck in which the line spins.

20 Claims, 10 Drawing Sheets

To Feed Motor Controller 202

To Drive Motor Controller

Manually Extend Line 13 to the Maximum or Desired Length

①

AUTOMATIC FEED SYSTEM FOR A TRIMMER

CROSS-REFERENCE TO RELATED APPLICATIONS

N/A

BACKGROUND

Some industrial mowers or trimmers are designed for use along roadsides or in other areas where the terrain may be uneven, and the vegetation may be tall and thick. Various types of industrial mowers and trimmers exist for such purposes. For example, large rotary mowers, which are similar to common lawn mowers, are oftentimes used by municipalities or other governmental entities to trim vegetation along roadsides. These rotary mowers typically employee metal cutting blades that create sparks and therefore frequently start fires during use, particularly when the vegetation is dry. These rotary mowers may also fling debris or be damaged if debris is not removed before mowing.

BRIEF SUMMARY

The present invention extends to an automatic feed system for a trimmer and to trimmers that include an automatic feed system. Such trimmers include a line that can be spun at high speeds to cut vegetation along roadsides or other areas. The automatic feed system is configured to dynamically detect the current length of the line and automatically feed the line to maintain a maximum or desired length for cutting. This length may typically correspond with the radius of a trimmer deck in which the line spins.

In some embodiments, the present invention may be implemented as a trimmer having an automatic feed system. The trimmer may include a line that is configured to be spun to cut vegetation. The line may also be configured to be fed to extend the line's length. The trimmer may include one or more line securing members through which the line is fed. The trimmer may further include a control system that is configured to monitor a force on the one or more line securing members while the line is spun and to determine from the force when the line is less than a maximum or desired length. The control system is also configured to automatically feed the line based on the force to reach the maximum or desired length.

In some embodiments, the trimmer may include a feed motor that controls the one or more line securing members. In such embodiments, monitoring the force on the one or more line securing members may include monitoring the feed motor.

In some embodiments, monitoring the feed motor may include monitoring a force required by the one or more line securing members to prevent the line from being fed.

In some embodiments, the one or more line securing members may be opposing gears or rollers, a rotating member with an opposing securing mechanism or opposing pinch members.

In some embodiments, the line is pinched between the opposing gears or rollers.

In some embodiments, the control system is configured to monitor a speed at which the line is spun.

In some embodiments, the trimmer may include a drive motor that causes the line to be spun and monitoring the speed at which the line is spun may include monitoring the drive motor. In such embodiments, monitoring the drive motor may include monitoring a torque required by the drive motor to cause the line to be spun at the speed.

In some embodiments, automatically feeding the line based on the force to reach the maximum or desired length may include one of: causing the one or more line securing members to rotate; ceasing to prevent the one or more line securing members from rotating, separating the one or more line securing members, or reducing a pinching force that the one or more line securing members apply to the line.

In some embodiments, determining from the force when the line is less than a maximum or desired length may include using a force when the line is at the maximum or desired length. In such embodiments, the force may be calculated based on a force required by the one or more line securing members to prevent the line from being fed.

In some embodiments, the present invention may be implemented as a method for automatically feeding a line of a trimmer. A current force caused by the line while the line is spun and has an unknown length can be monitored. A known force caused by the line while the line is spun and has a known length can be obtained. The current force and the known force can be used to calculate a current length of the line. Then, the line can be automatically fed to cause the line to have a maximum or desired length.

In some embodiments, the known length is the maximum or desired length.

In some embodiments, a current speed of the line may also be monitored and the known force may correspond with the current speed.

In some embodiments, monitoring the current force may include monitoring a force required to prevent the line from being fed.

In some embodiments, monitoring the current force may include monitoring the current force applied by the line to one or more line securing members, and automatically feeding the line may include causing the one or more line securing members to allow the line to be fed.

In some embodiments, the present invention may be implemented as an automatic feed system for a trimmer. The automatic feed system may include a line feed unit that is secured to a deck. The line feed unit may contain a line and be configured to rotate relative to the deck to cause the line to spin within the deck. The automatic feed system may also include a drive motor that is configured to cause the line feed unit to rotate. The automatic feed system may also include one or more line securing members through which the line passes. The automatic feed system may also include a feed motor that is configured to control the one or more line securing members. The automatic feed system may also include a control system that is configured to monitor the drive motor and the feed motor to determine a current length of the line. The control system may also be configured to automatically feed the line when the current length of the line is determined to be less than a maximum or desired length.

In some embodiments, the control system may monitor a force of the drive motor and a force of the feed motor.

In some embodiments, the control system may cause the feed motor to cause the one or more line securing members to allow the line to be fed.

In some embodiments, the one or more line securing members may be opposing gears or rollers that pinch the line, opposing pinch members that pinch the line, or a rotating member with an opposing securing mechanism that pinch the line.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

An automatic feed system configured in accordance with embodiments of the present invention may be used on a variety of trimmers. Example embodiments will be described primarily in the context of trimmers used along the roadside to cut vegetation. However, embodiments of the present invention should not be limited to such trimmers.

Figure 1:
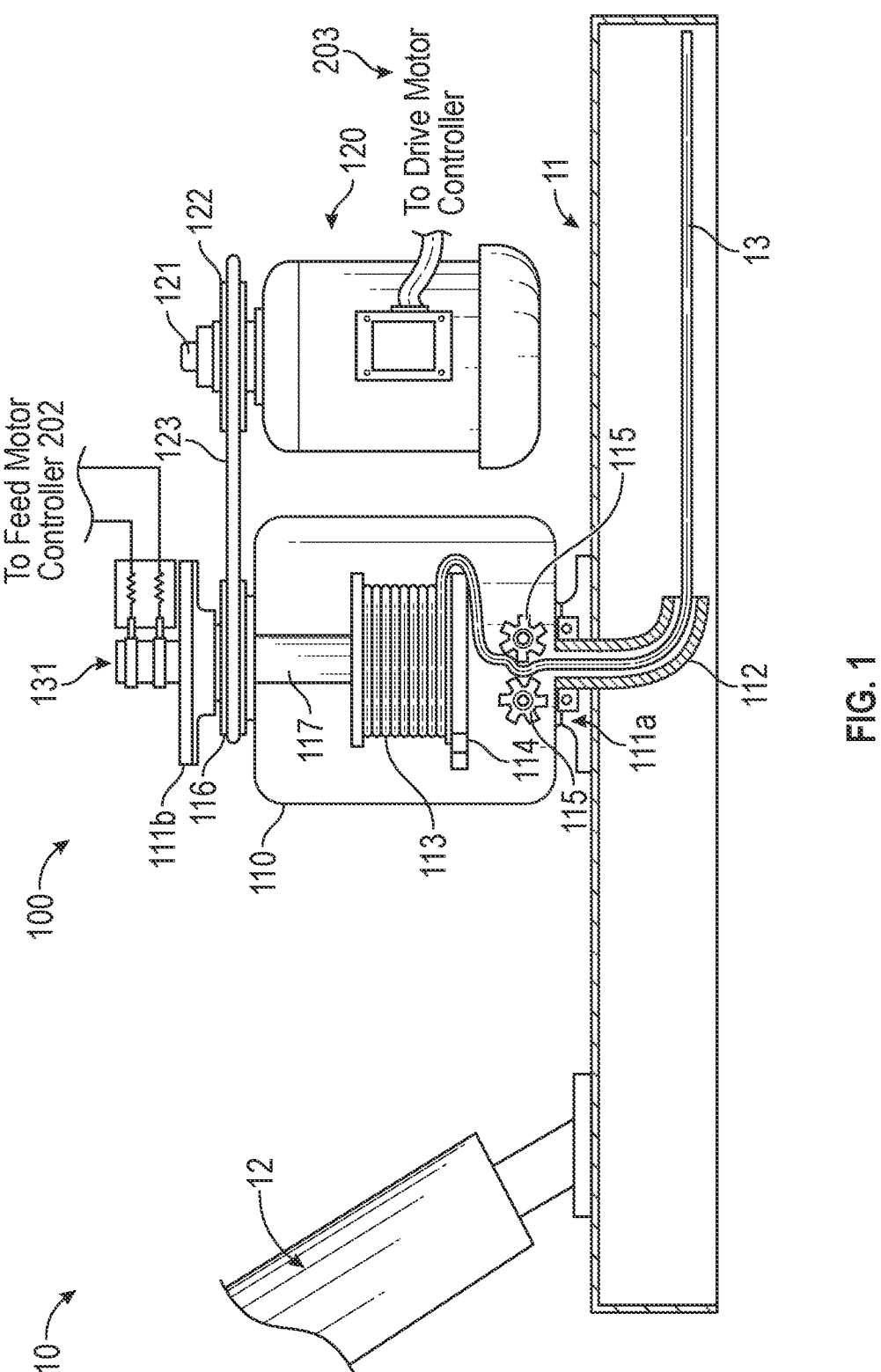
FIG. 1 illustrates an automatic feed system for a trimmer that is configured in accordance with one or more embodiments of the present invention.
Figure 2:
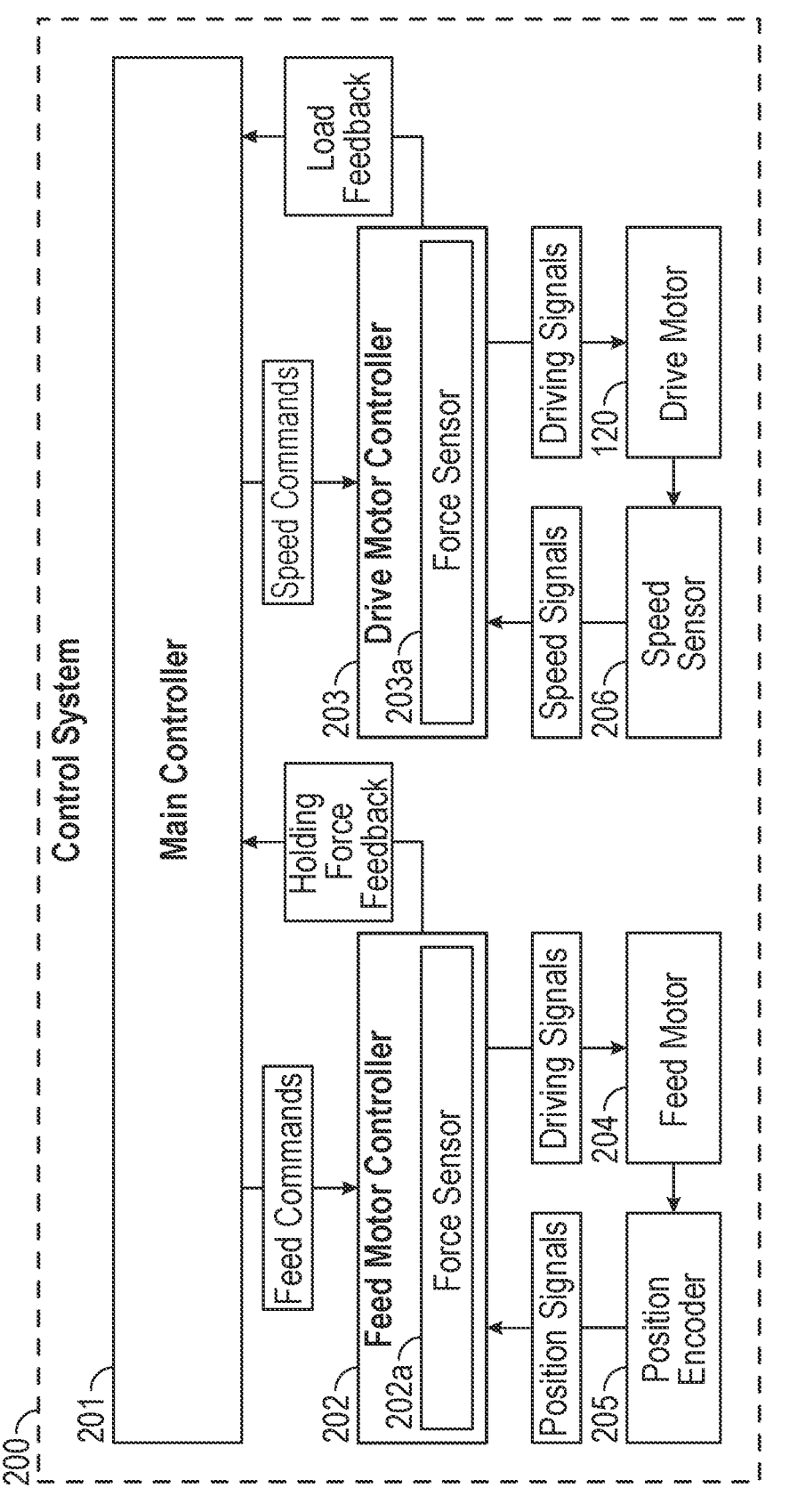
FIG. 2 illustrates a control system of an automatic feed system that is configured in accordance with one or more embodiments of the present invention.

FIG. 1 is a partial cutaway side view of a trimmer 10 that includes an automatic feed system 100 that is configured in accordance with embodiments of the present invention. FIG. 2 is a block diagram of a control system of automatic feed system 100.

Trimmer 10 may include a deck 11 that may be supported off the ground in any suitable manner. Deck 11 could be integrated into or connected to a tractor (or another vehicle) that may be driven along a roadside or other area. FIG. 1 shows an example where deck 11 is supported by an arm 12, which may be pivoting or articulating, but deck 11 could also be supported via a fixed mechanism. Deck 11 may typically have a circular shape with enclosed sides to minimize the flinging of trimmings and debris. However, the sides of deck 11 need not be enclosed, and deck 11 could have any suitable shape that accommodates the spinning of line 13. In some embodiments, the tractor may be autonomous.

Automatic feed system 100 can be used to ensure that a maximum or desired length of line 13 is automatically maintained during use of trimmer 10. Typically, this maximum/desired length may be just shorter than the dimensions (e.g., the radius) of deck 11 so that line 13 is maintained at the maximum length without contacting deck 11. Automatic feed system 100 may include various mechanical, hydraulic, and/or electronic components to perform this automatic feeding of line 13.

A line feed unit 110 may be mounted to deck 11 overtop the intended center of rotation of line 13 and is configured to rotate with line 13. For example, in FIG. 1, line feed unit 110 is mounted on top of deck 11 via rotary bearings 111a and 111b. Although not shown, rotary bearing 111b could be mounted to a housing or other support structure. A line guide 112 may be coupled to and extend downwardly from line feed unit 110 at its axis of rotation and may pass through rotary bearing 111a. Line guide 112 is a conduit for line 13 as it exits line feed unit 110 and functions to direct line 13 into a horizontal orientation.

A spool 113 may be contained within line feed unit 110 and may be used to store line 13 before it is fed into deck 11. In particular, a substantial length of line 13 may be wrapped around spool 113 with the end of line 13 extending through line guide 112 and into deck 11. A feed brake 114 may be coupled to or formed at the bottom of spool 113 and may function to prevent line 13 from unraveling from spool 113 when it is not being fed.

Line securing members 115 may be positioned between spool 113 and line guide 112. Line 13 may be routed between/through line securing members 115 which may selectively apply a holding force to line 13 to control when line 13 is fed into deck 11. In the depicted embodiment, line securing members 115 are in the form of opposing gears having teeth that pinch line 13 such that the gears must rotate to allow line 13 to be fed. However, other forms of line securing members 115 could be used such as opposing rollers, a single rotating member with an opposing securing mechanism that prevents line 13 from being fed unless the rotating member is rotated, opposing pinch members that pinch line 13, etc. In any case, line securing member(s) 115 are configured to allow line 13 to be selectively fed into deck 11. As described in greater detail below, automatic feed system 100 can include a feed motor 204 for driving line securing members 115.

Line feed unit 110, line guide 112, spool 113, and line securing members 115 may rotate together to spin line 13. For example, automatic feed system 100 may include a drive motor 120 that can be mounted to deck 11 (or other housing or support structure) alongside line feed unit 110 and may drive a belt 123 that is routed around a sprocket 122 on a shaft 121 of drive motor 120 and a sprocket 116 on a shaft 117 of line feed unit 110. Accordingly, drive motor 120 can rotate shaft 121 to cause line 13 to be rotated at a desired speed.

Automatic feed system 100 can include a slip ring assembly 131 by which a feed motor controller 202 can be coupled to feed motor 204. Although not visible in FIG. 1, feed motor 204 can be arranged to control line securing members 115 to selectively feed line 13. For example, when line securing members 115 rotate, feed motor 204 could be mounted to an internal wall of line feed unit 110 and could drive shafts on which line securing members 115 are mounted. As another example, when line securing members 115 apply a pinching force to selectively feed line 13, feed motor 204 can be electrically coupled to actuators that drive line securing members 115.

FIG. 2 provides an example of a control system 200 that can form part of and be used to control automatic feed system 100. This example is based on embodiments where feed motor 204 and drive motor 120 are electric motors. However, in some embodiments, feed motor 204 and/or drive motor 120 could be hydraulic motors. Control system 200 includes a main controller 201, feed motor controller 202, feed motor 204, a position encoder 205, a drive motor controller 203, drive motor 120, and a speed sensor 206.

Main controller 201, feed motor controller 202, and drive motor controller 203 could be implemented using any suitable circuitry including, but not limited to, a central processing unit, a microprocessor, a microcontroller, a field programming gate array, an application-specific integrated circuit, a system on a chip, etc. Also, main controller 201, feed motor controller 202, and drive motor controller 203 could be implemented using separate circuitry as represented in FIG. 2 or with the same circuitry.

As represented in FIG. 2, feed motor controller 202 is configured to control feed motor 204 by providing driving signals that cause feed motor 204 to drive (e.g., to rotate, squeeze, etc.) line securing members 115 based on feed commands received from main controller 201. Position encoder 205 is configured to monitor the rotation of feed motor 204 and output position signals defining the current rotational position. In some embodiments, feed motor controller 202 could use these position signals while line 13 is being fed to determine when line 13 has reached the maximum/desired length.

Feed motor controller 202 may include a force sensor (or sensors) 202a that is configured to detect the force of the driving signals, particularly when feed motor controller 202 is outputting driving signals that cause feed motor 204 to drive line securing members 115 to prevent feeding of line 13. Stated another way in the context of an electric feed motor, sensor 202a can monitor how much current feed motor 204 is drawing to cause line securing members 115 to not rotate, squeeze, etc. to prevent line 13 from being fed. As described in greater detail below, during use of trimmer 10 and in embodiments where line securing member(s) 115 rotate, the rotation of line 13 will create a pulling force on the portion of line 13 between line securing members 115 thereby applying torque to line securing members 115. To prevent line securing members 115 from rotating, feed motor 204 must be driven to offset this torque. The amount of current that feed motor 204 draws to offset this torque (or the amount of pressure of a hydraulic feed motor 204 to offset this torque) can therefore be detected by force sensor 202a and reported to main controller 201 as holding force feedback. In other words, the holding force is the amount of force (e.g., current or pressure) required by feed motor 204 to cause line securing members 115 to prevent line 13 from being fed.

Drive motor controller 203 is configured to control drive motor 120 by providing driving signals that cause drive motor 120 to rotate based on speed commands received from main controller 201. Because drive motor 120 controls the spinning of line 13, these speed commands control how fast line 13 is spun. Speed sensor 206 can monitor the speed of rotation of drive motor 120, and therefore the speed of rotation of line 13, and can provide speed signals to drive motor controller 203 representing this speed. Drive motor 203 can adjust the driving signals based on the speed signals to ensure that the speed at which line 13 is rotated matches the speed commands.

Drive motor controller 203 may include a force sensor (or sensors) 203a that is configured to detect the force (e.g., current or pressure) of the driving signals when drive motor 120 is spinning line 13. Stated another way, sensor 203a can monitor how much force is required to cause drive motor 120 to spin line 13 at the speed defined by the speed commands. Drive motor controller 203 can provide load feedback to main controller 201 where the load feedback may define the force that drive motor 120 is creating (e.g., by measuring the current drawn by or the hydraulic pressure of drive motor 120) while rotating line 13 and may also identify the current speed at which line 13 is rotating.

As described in detail below, control system 200 can be used to automatically detect the length of line 13 and then automatically feed additional line 13 to maintain line 13 at a maximum or desired length. For example, main controller 201 can use the holding force feedback and the load feedback to calculate the current length of line 13. If the current length is less than the maximum or desired length, main controller 201 can provide feed commands to cause line 13 to be fed an appropriate amount.

Figure 3A:
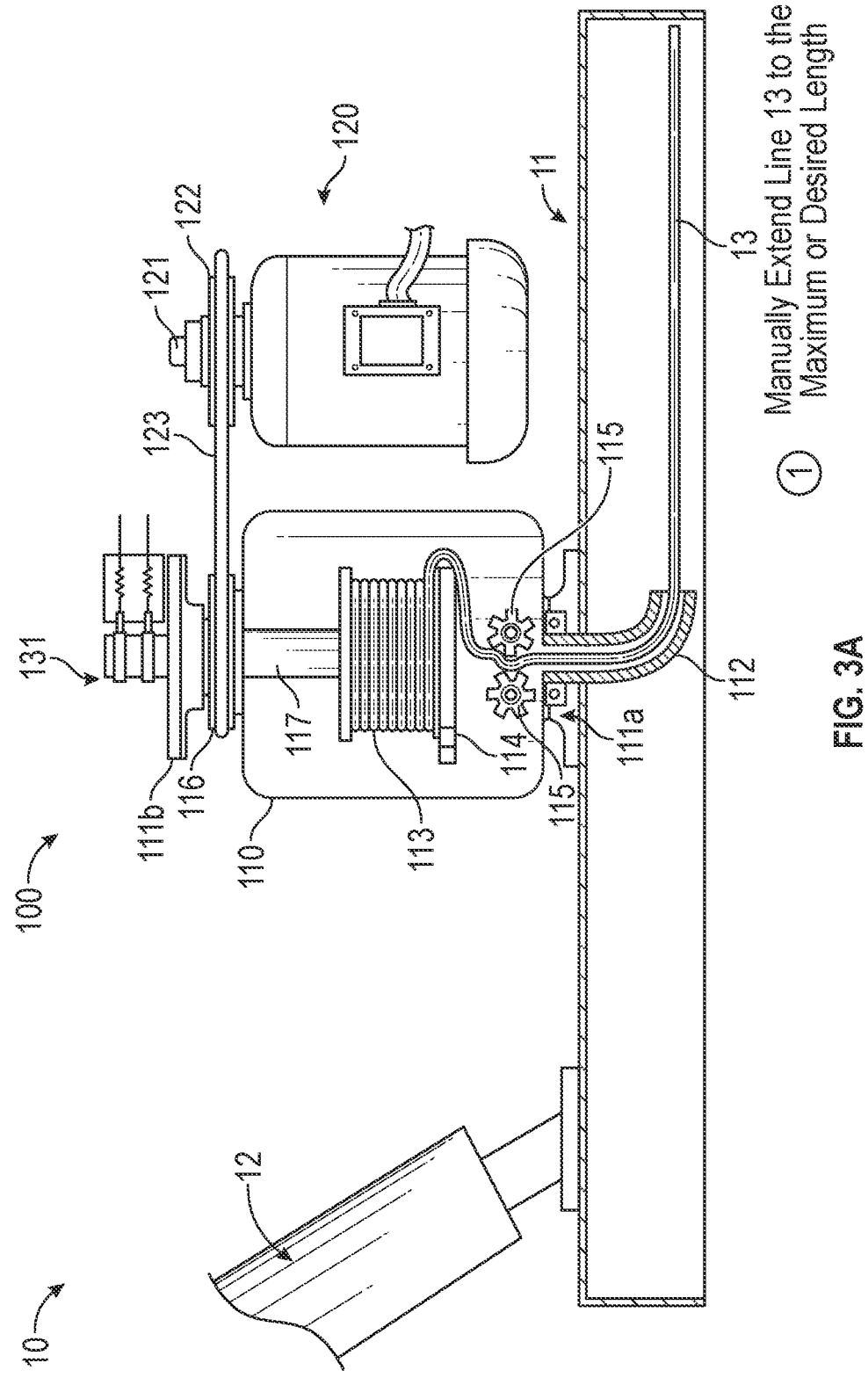
FIGS. 3A-3C provide an example of a calibration process for an automatic feed system that is configured in accordance with one or more embodiments of the present invention.
Figure 3B:
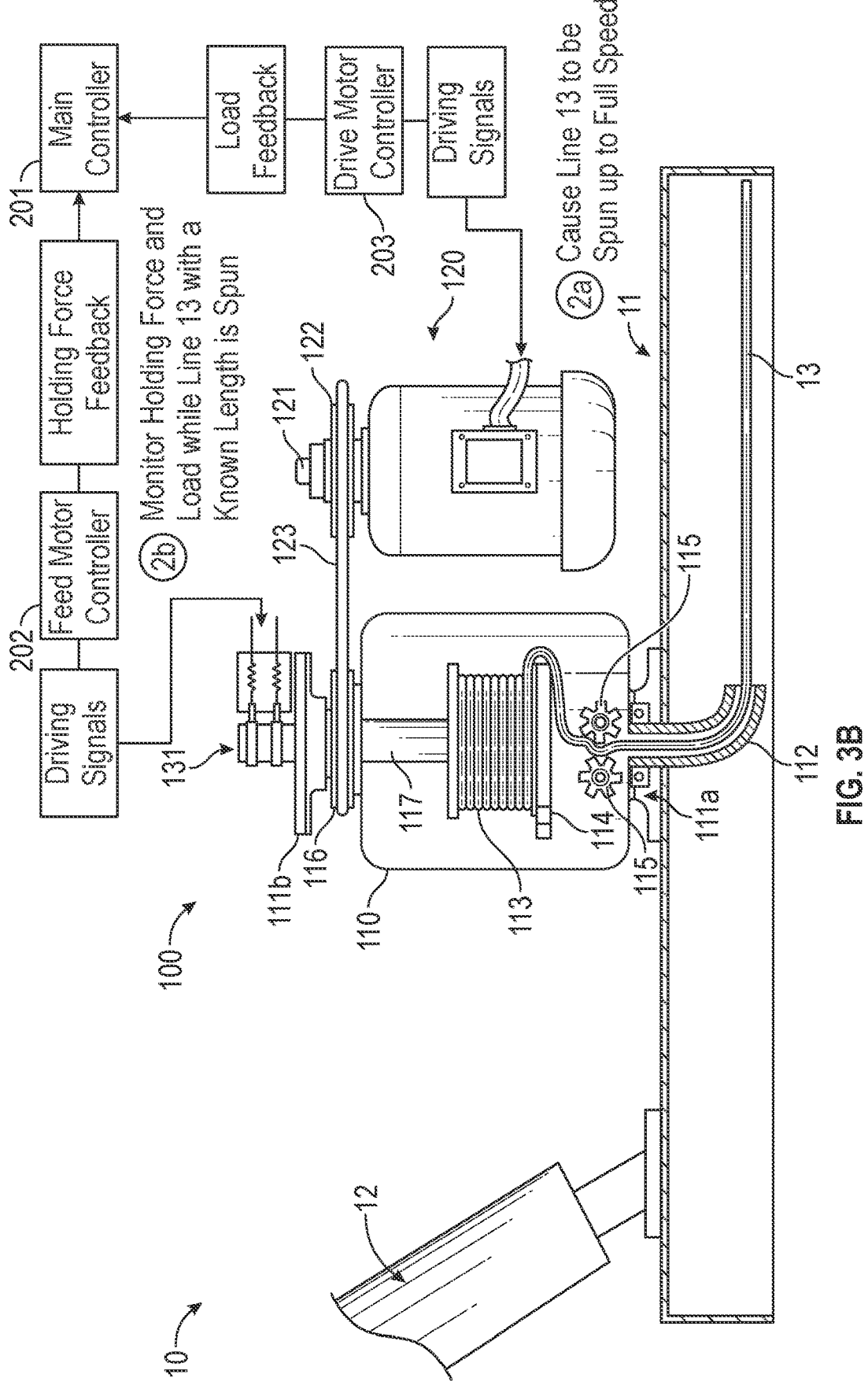
Figure 3C:
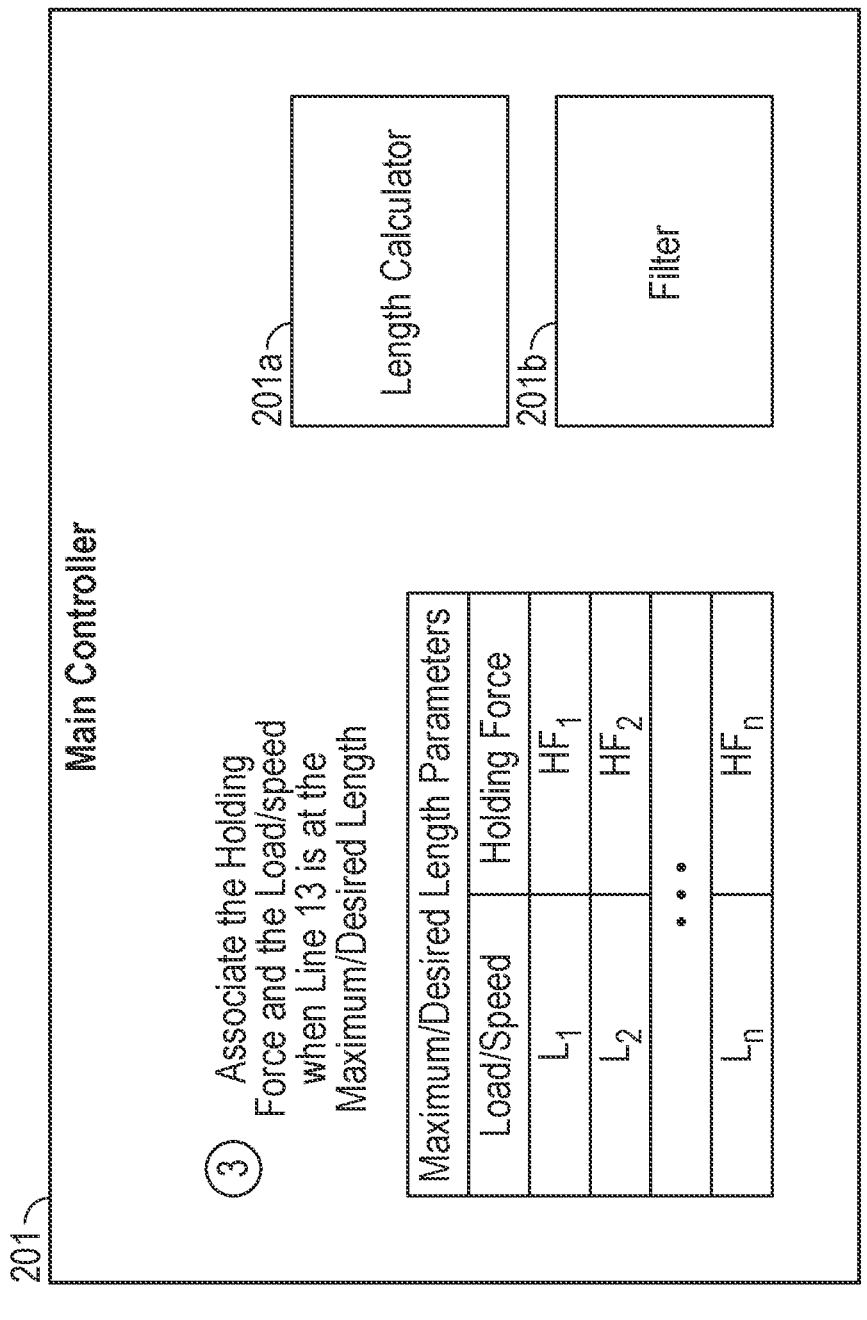

FIGS. 3A-3C provide an example of a calibration process that automatic feed system 100 may perform to enable it to automatically feed line 13 to maintain a maximum or desired length. In some embodiments, this calibration process could be performed on each trimmer 10 or may be performed on one trimmer 10 and applied to other similar trimmers 10. Given the differences in each trimmer 10 and each line 13, the best performance may be obtained by performing the calibration process individually on each trimmer 10 and whenever a new line 13, or new type of line, is used. In any case, the calibration process can be performed to identify the holding force when line 13 having a known length is spun, possibly over a range of speeds.

Turning to FIG. 3A, it is assumed that line 13 is wrapped around spool 113 and has been fed, possibly manually, between line securing members 115, through line guide 112, and to the maximum or desired length. For example, upon obtaining trimmer 10 or a new line 13, a user could extend line 13 just short of the inner wall of deck 11 or just short of a line cutting blade positioned adjacent the inner wall.

Turning to FIG. 3B, in step 2a, trimmer 10 could be operated to cause line 13 to be spun up to full speed. For example, the user could interface with main controller 201 to cause driving signals to be provided to drive motor 120. As mentioned above, the amount of current that drive motor 120 draws (or the hydraulic pressure of drive motor 120) when the driving signals are applied can dictate the speed at which line 13 is spun. In other words, the load of drive motor 120 represents the speed of line 13. Accordingly, in step 2b, and while line 13 is spun, main controller 201 can monitor the load of drive motor 120 (or speed of line 13) and can also monitor the holding force of line securing members 115. In some embodiments, main controller 201 could cause drive motor 120 to spin line 13 over a range of speeds and could monitor the load/speed and holding force over this range.

Turning to FIG. 3C, in step 3, main controller 201 can associate the holding force with the corresponding load/speed as part of a set of maximum/desired length parameters. Accordingly, these parameters define the holding force that should exist when line 13 is spun at the specified speed (i.e., when drive motor 120 experiences the specified load) if line 13 has the maximum/desired length.

FIG. 3C also shows that main controller 201 can implement a length calculator 201a that may employ the maximum/desired length parameters during subsequent operation of trimmer 10 to determine whether line 13 should be fed to maintain the maximum/desired length. As described in detail below, length calculator 201a can obtain a current holding force and a current load/speed and use them in conjunction with the maximum/desired length parameters to determine if the current length of line 13 is at the maximum/desired length. If not, main controller 201 can cause line 13 to be fed until it is at the maximum/desired length.

FIG. 3C further shows that main controller 201 (or possibly feed motor controller 202) can include a filter 201b. Filter 201b can be used to filter the holding force readings it obtains during operation of trimmer 10 to remove spikes that occur when line 13 strikes debris or whenever spikes in the holding force otherwise occur. For example, filter 201*b* could be used to create an average of holding force readings during operation of trimmer 10 at a set speed.

Figure 4A:
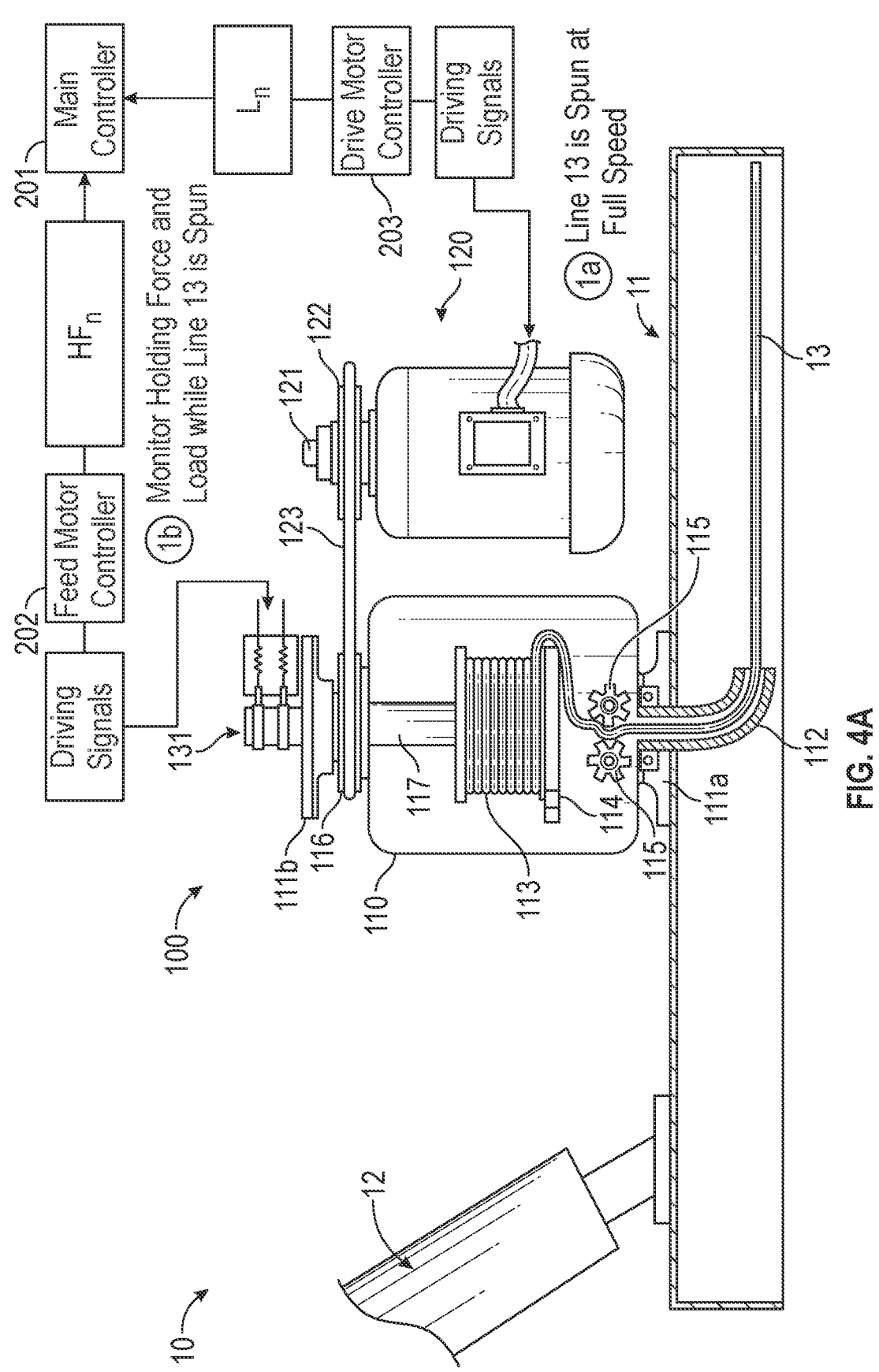
FIGS. 4A-4E provide an example of how an automatic feed system that is configured in accordance with one or more embodiments of the present invention may maintain a maximum or desired length of a line during use.

FIGS. 4A-4E provide an example of how automatic feed system 100 can automatically feed line 13 to maintain the maximum/desired length during use. Turning to FIG. 4A, it is assumed that trimmer 10 is now being used to cut vegetation. As represented as step 1*a*, it is assumed the line 13 is spun at full speed. It is also assumed that line 13 is still at the maximum/desired length (e.g., the length used during the calibration process). As represented in step 1*b*, the holding force and the load can be continuously monitored while line 13 is spun. For example, feed motor controller 202 and drive motor controller 203 could be configured to provide holding force feedback and load feedback on a periodic basis, whenever a change in the holding force or load occurs, etc. For purposes of this example, it is assumed that the load is $L_n$ and the holding force is $HF_n$ while line 13 is spun at full speed. Also, to simplify the example, spikes that may occur in the holding force are ignored.

Figure 4B:
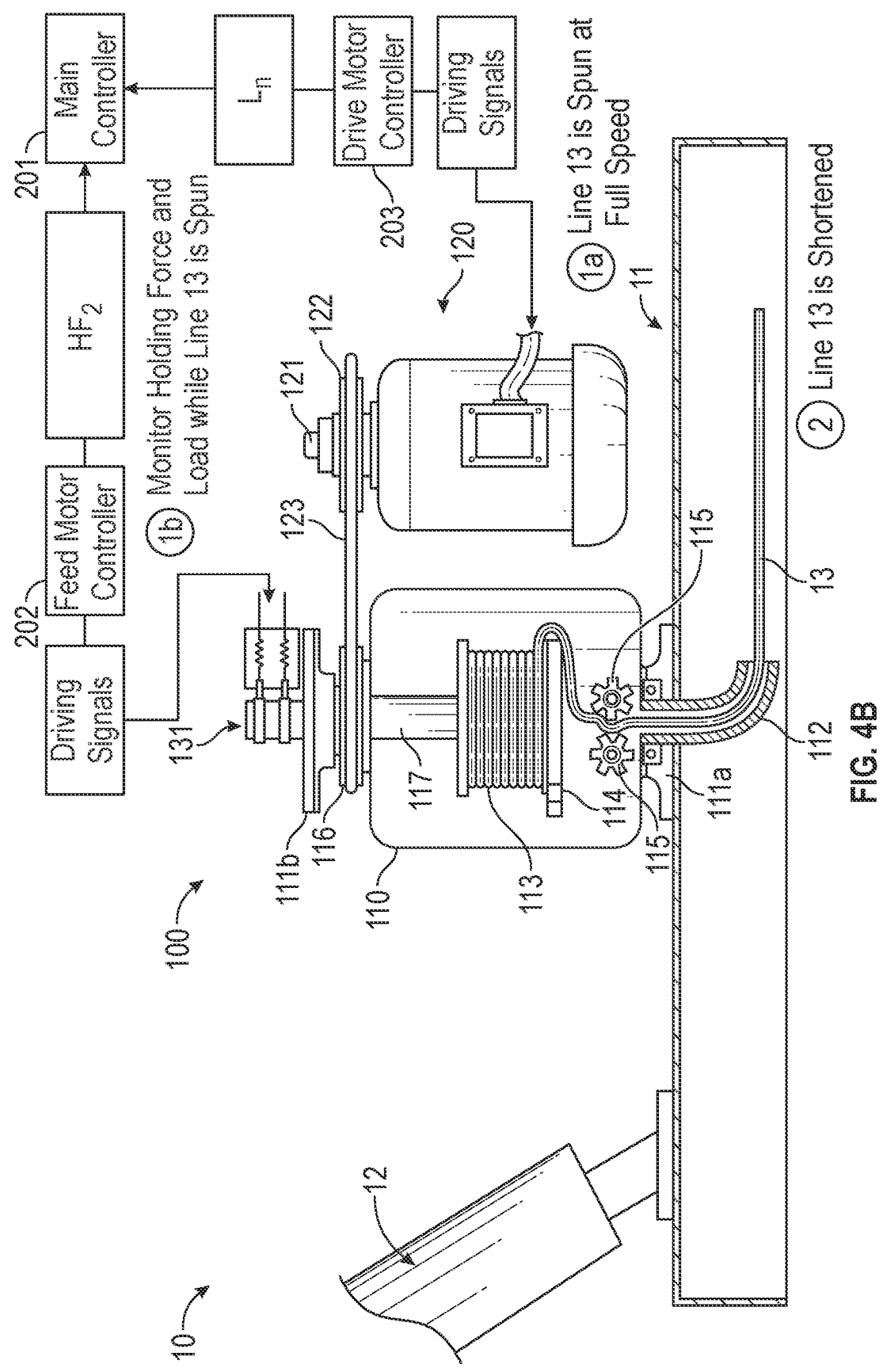

Turning to FIG. 4B, it is assumed that line 13 remains spinning at full speed. Then, as represented as step 2, line 13 is shortened. For example, line 13 could strike a sharp object and be sheared off, could be worn down, etc. When line 13 is shortened and assuming line 13 remains spinning at the same full speed, the torque that line 13 creates on line securing members 115 will be reduced. As a result, the holding force that feed motor controller 202 reports to main controller 201 will also be reduced. In other words, feed motor 204 will require less current or pressure to cause line securing members 115 to prevent line 13 from being fed. In this example, it is assumed that the holding force after line 13 is shortened is $HF_x$. For simplicity, it is also assumed that the load on drive motor 204 remains unchanged at $L_n$. However, the shorter length of line 13 may also cause drive motor 204 to require less force to spin line 13 at full speed. Therefore, as mentioned above, the load feedback could include both the load and the speed of drive motor 120.

Figure 4C:
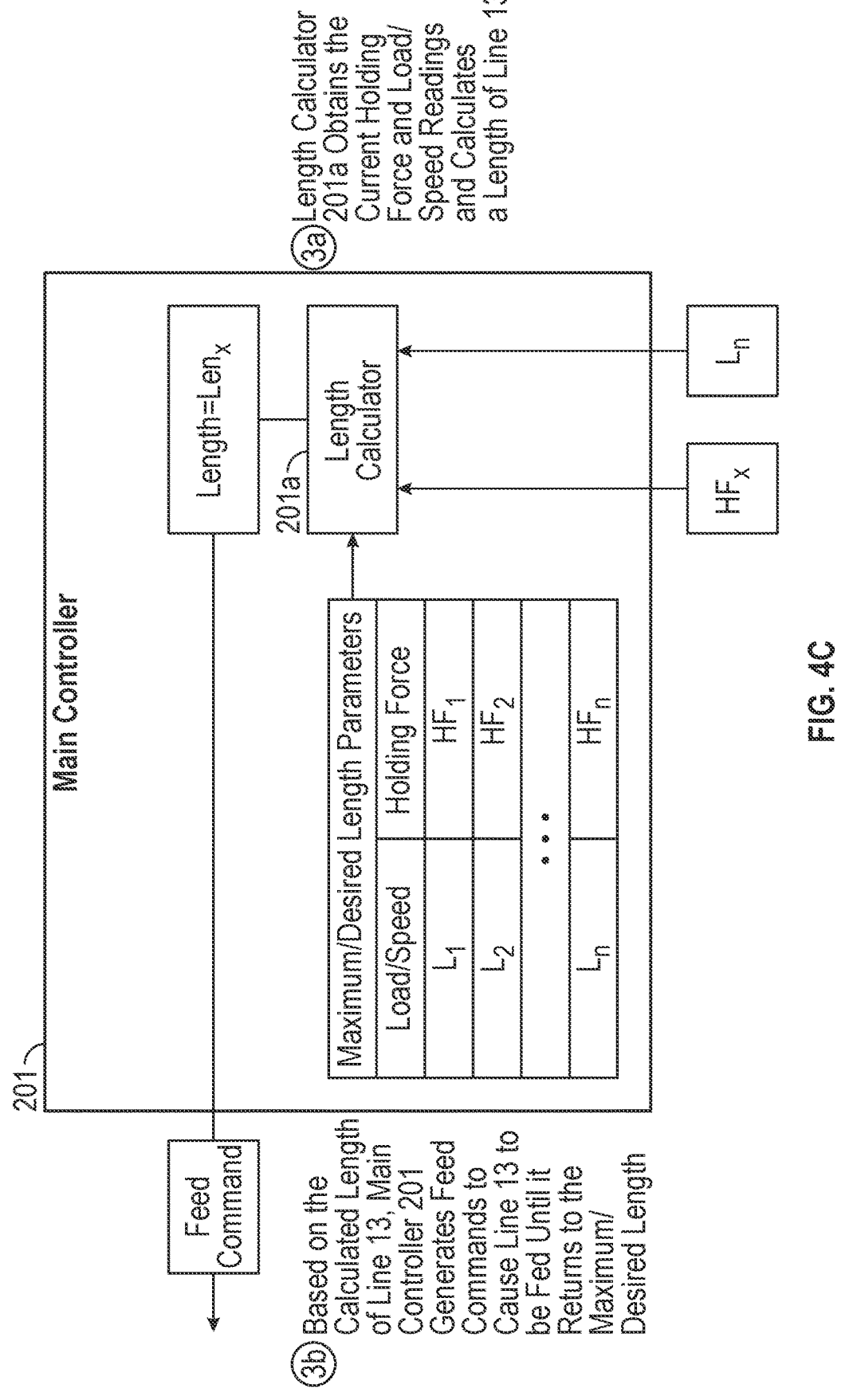

Turning to FIG. 4C, in step 3*a*, the current holding force ($HF_x$) and the current load ($L_n$) are input to length calculator 201*a*. Length calculator 201*a* can use the maximum/desired length parameters and the current holding force and current load to calculate the current length of line 13 (whether as an absolute length or as a length relative to the maximum/desired length). For example, length calculator 201*a* can be configured to use the current holding force and the current load to calculate a holding force representing the amount of force that feed motor 204 must apply to line securing members 115 to offset the torque (or force) caused by the spinning of line 13. With this force known, and by using the holding forces and loads when line 13 has the maximum/desired length (e.g., by determining the holding force when line 13 is at the maximum/desired length), length calculator 201*a* can calculate the current length of line 13. Stated another way, length calculator 201*a* will know the maximum/desired length of line 13 and the holding force at the corresponding load/speed from the calibration process, and will know the current holding force and current load/speed and can therefore use such parameters to calculate the unknown current length of line 13. In this example, it is assumed that length calculator 201*a* calculates that the current length of line 13 is $Len_x$.

In step 3*b*, main controller 201 can then calculate and generate feed command(s) for causing feed motor controller 202 to provide driving signals to feed motor 204 that will result in line securing members 115 feeding line 13 to return to the maximum/desired length. For example, a feed command could define the amount by which feed motor 204 should rotate line securing members 115, a duration of time that line securing members 115 should allow line 13 to be fed, a length of line 13 that should be fed (e.g., when the control system includes a sensor for monitoring the amount of line 13 that is fed). Alternatively, main controller 201 could output a feed command that instructs feed motor controller 202 to commence feeding line 13 and can continuously monitor the holding force as line 13 is fed to determine when the holding force has returned to match the holding force associated with the maximum/desired length of line 13. Accordingly, control system 200 could use different techniques to cause line 13 to be automatically fed until reaching the maximum/desired length.

Figure 4D:
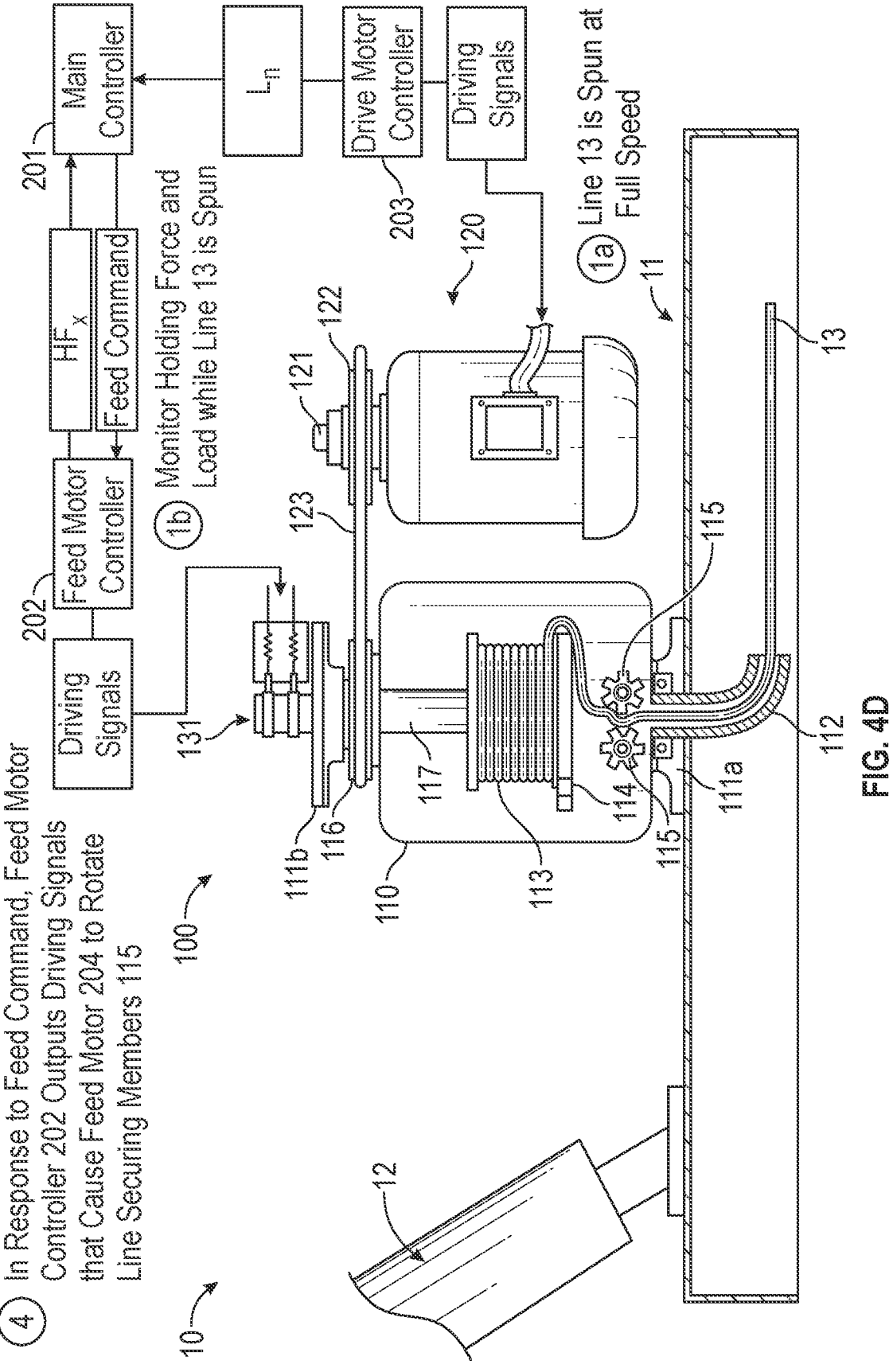

Turning to FIG. 4D, in step 3, feed motor controller 202 provides driving signals to feed motor 204. Unlike in FIGS. 4A and 4B, the driving signals in FIG. 4D cause feed motor 204 to cause line securing members 115 to allow line 13 to be fed (e.g., by rotating, by not squeezing line 13, etc.). Notably, in some embodiments where line securing members 115 rotate, feed motor 204 may actively rotate line securing members 115, while in other embodiments, feed motor 204 could cause line securing members 115 to rotate by ceasing to resist the torque that line 13 causes. In either case, the position signals from position encoder 205 could be used to determine when feed motor 204 has been rotated in accordance with the feed command. In some embodiments where line securing members 115 apply a squeezing force to line 13, feed motor 204 could cause line securing members 115 to physically separate or could reduce the squeezing force sufficiently to allow line 13 to be pulled between line securing members. Accordingly, many different techniques could be used to control line securing members 115. As these driving signals are provided to control line securing members 115, line 13 can continue to be spun at full speed and the current holding force and load can continue to be monitored.

Figure 4E:
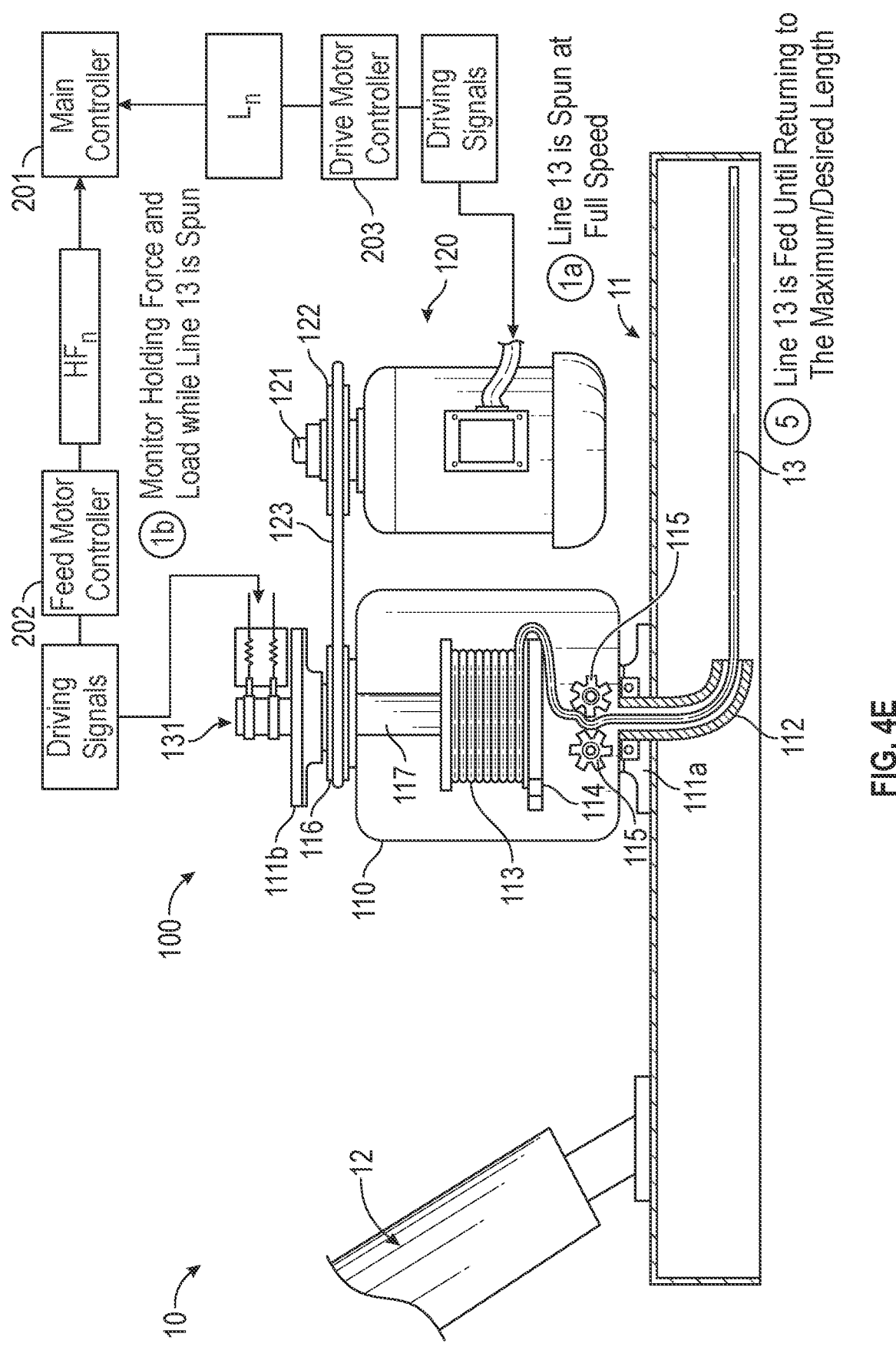

Turning to FIG. 4E, as a result of the driving signals that feed motor controller 202 provided in response to the feed command, line 13 has been fed until reaching the maximum/desired length. At this point, the holding force reported to main controller 201 has returned to $HF_n$. Accordingly, by continuing to monitor the holding force and load, main controller 201 can know that line 13 has been fed appropriately.

This process can be performed repeatedly to ensure that line 13 is automatically fed. In some embodiments, main controller 201 can be configured to detect when the length of line 13 has fallen below a threshold (e.g., a 5-10% reduction in length) and may then calculate the feed commands to return line 13 to the maximum/desired length.

As can be seen, line securing members 115 can have any suitable form that allows them to selectively feed line 13. Regardless of the form of line securing members 115 including the type of motor by which they are controlled, the holding force for preventing line 13 from being fed while the line is spun as well as the load to spin the line can be monitored to determine when to automatically feed the line.

In summary, automatic feed system 100 can ensure that line 13 automatically remains at a maximum/desired length throughout the operation of trimmer 10. As a result, trimmer 10 can run more efficiently. Automatic feed system 100 may be particularly beneficial when trimmer 10 is autonomous.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A trimmer having an automatic feed system comprising:
  a line that is configured to be spun to cut vegetation, the line also being configured to be fed to extend a length of the line;
  a drive motor that causes the line to be spun;
  one or more line securing members through which the line is fed;
  a feed motor that controls the one or more line securing members including to apply a holding force to the one or more line securing members to prevent the line from being fed; and
  a control system that is configured to monitor the holding force applied by the feed motor while the line is spun by the drive motor and to determine, from the holding force, when the line is less than a maximum or desired length, including by using a current holding force and a known holding force associated with a known length of the line, wherein the control system is also configured to automatically feed the line based on the holding force to reach the maximum or desired length, wherein the current holding force is a force applied by or through the feed motor to cause the one or more line securing members to prevent the line from being fed while the line is spun, and wherein the known holding force is associated with the line having the maximum or desired length.

2. The trimmer of claim 1, wherein the one or more line securing members comprise one of:
  opposing gears or rollers;
  a rotating member with an opposing securing mechanism; or
  opposing pinch members.

3. The trimmer of claim 2, wherein the one or more line securing members are opposing gears or rollers, and wherein the line is pinched between the opposing gears or rollers.

4. The trimmer of claim 1, wherein the control system is configured to monitor a speed at which the line is spun.

5. The trimmer of claim 4, wherein monitoring the speed at which the line is spun comprises monitoring the drive motor.

6. The trimmer of claim 5, wherein monitoring the drive motor comprises monitoring a torque created by the drive motor to cause the line to be spun at the speed.

7. The trimmer of claim 1, wherein automatically feeding the line based on the holding force to reach the maximum or desired length comprises one of:
  causing the one or more line securing members to rotate;
  ceasing to prevent the one or more line securing members from rotating;
  separating the one or more line securing members; or
  reducing a pinching force that the one or more line securing members apply to the line.

8. The trimmer of claim 1, wherein determining from the holding force when the line is less than the maximum or desired length comprises using an amount of the holding force when the line is at the maximum or desired length.

9. The trimmer of claim 1, wherein the control system is configured to automatically feed the line until the holding force corresponds to the known holding force associated with the known length of the line.

10. The trimmer of claim 1, wherein determining when the line is less than the maximum or desired length comprises determining that the length of the line has fallen below a threshold relative to the maximum or desired length.

11. A trimmer having an automatic feed system comprising:
  a line that is configured to be spun to cut vegetation, the line also being configured to be fed to extend a length of the line;
  a drive motor that causes the line to be spun;
  one or more line securing members through which the line is fed;
  a feed motor that controls the one or more line securing members including to apply a holding force to the one or more line securing members to prevent the line from being fed; and
  a control system that is configured to automatically feed the line by:
    monitoring a current holding force applied by the feed motor to prevent the line from being fed while the line is spun and has an unknown length;
    obtaining a known holding force associated with preventing a line from being fed while the line is spun and has a known length;
    calculating, from the current holding force and the known holding force, a current length of the line; and
    automatically feeding the line to cause the line to have a maximum or desired length;
    wherein the current holding force is a force required by the feed motor to cause the one or more line securing members to prevent the line from being fed while the line is spun and has the unknown length, and wherein the known holding force represents a force required by a feed motor to cause one or more line securing members to prevent a line from being fed while the line is spun and has the known length, the known length being the maximum or desired length.

12. The trimmer of claim 11, wherein calculating the current length of the line comprises calculating the current length as an absolute length or as a length relative to the maximum or desired length.

13. The trimmer of claim 11, wherein the control system automatically feeds the line also by:
  monitoring a current speed of the line;
  wherein the known holding force corresponds with the current speed.

14. The trimmer of claim 11, wherein automatically feeding the line comprises causing the one or more line securing members to allow the line to be fed.

15. The trimmer of claim 11, wherein the known holding force comprises a stored value obtained using a calibration process performed on another trimmer.

16. An automatic feed system for a trimmer comprising:
  a line feed unit that is secured to a deck, the line feed unit containing a line and being configured to rotate relative to the deck to cause the line to spin within the deck;
  a drive motor that is configured to cause the line feed unit to rotate;
  one or more line securing members through which the line passes;
  a feed motor that is configured to control the one or more line securing members including to apply a holding force to the one or more line securing members to prevent the line from being fed;

a control system that is configured to monitor the drive motor and the holding force applied by the feed motor to determine a current length of the line based on a current holding force and a known holding force associated with a known length of the line, wherein the control system is also configured to automatically feed the line when the current length of the line is determined to be less than a maximum or desired length, wherein the current holding force is a force applied by or through the feed motor to cause the one or more line securing members to prevent the line from being fed while the line is spun, and wherein the known holding force is associated with the line having the maximum or desired length.

17. The automatic feed system of claim 16, wherein the control system monitors a force of the drive motor.

18. The automatic feed system of claim 16, wherein the control system causes the feed motor to cause the one or more line securing members to allow the line to be fed.

19. The automatic feed system of claim 16, wherein the one or more line securing members are one of:

opposing gears or rollers that pinch the line;

opposing pinch members that pinch the line; or a rotating member with an opposing securing mechanism that pinch the line.

20. The automatic feed system of claim 16, wherein the control system is configured to generate a feed command defining one of an amount by which the feed motor should rotate the one or more line securing members, a duration of time that the one or more line securing members should allow the line to be fed, or a length of line to be fed.

* * * * *